US008528935B2

(12) United States Patent
Miyata et al.

(10) Patent No.: US 8,528,935 B2
(45) Date of Patent: Sep. 10, 2013

(54) AIRBAG APPARATUS AND TETHER SEWING METHOD

(75) Inventors: Yasuhito Miyata, Tokyo (JP); Hiroki Shibata, Tokyo (JP)

(73) Assignee: Takata Corporation, Tokyo (JP)

( * ) Notice: Subject to any disclaimer, the term of this patent is extended or adjusted under 35 U.S.C. 154(b) by 84 days.

(21) Appl. No.: 13/233,956

(22) Filed: Sep. 15, 2011

(65) Prior Publication Data
US 2012/0068446 A1 Mar. 22, 2012

(30) Foreign Application Priority Data
Sep. 17, 2010 (JP) ................................. 2010-209204

(51) Int. Cl.
*B60R 21/2338* (2011.01)
(52) U.S. Cl.
USPC .............. 280/743.2; 112/475.01; 112/475.04; 112/475.06; 112/475.08
(58) Field of Classification Search
USPC ......... 280/728.1, 743.2; 112/475.01, 457.04, 112/475.06, 457.08; 428/99
See application file for complete search history.

(56) References Cited

U.S. PATENT DOCUMENTS
7,658,409 B2 * 2/2010 Ford et al. .................. 280/743.2

FOREIGN PATENT DOCUMENTS
| JP | 05-116575 | 5/1993 |
| JP | 07-304411 | 11/1995 |
| JP | 2000-095049 | 4/2000 |

* cited by examiner

*Primary Examiner* — Ruth Ilan
(74) *Attorney, Agent, or Firm* — Foley & Lardner LLP (57) ABSTRACT

There is provided an airbag that is folded up in a normal state and is inflated and deployed in an emergency state. The airbag includes: a base fabric; a tether sewn to the base fabric and configured to restrict a shape of the airbag when the airbag is inflated and deployed. The base fabric has a first pin hole therethrough in a contact region where the base fabric and the tether contacts each other, and the tether has a second pin hole therethrough in the contact region, wherein a position of the second pin hole corresponds to a position of the first pin hole. The tether has a folded back portion sewn to the tether and covering the first and second pin holes. The respective first and second pin holes are configured to receive a positioning pin for fixing the base fabric and tether to each other.

11 Claims, 8 Drawing Sheets

VEHICLE INNER SIDE          DOOR SIDE

AIRBAG APPARATUS AND TETHER SEWING METHOD

This application claims priority from Japanese Patent Application No. 2010-209204, filed on Sep. 17, 2010, the entire contents of which are herein incorporated by reference.

BACKGROUND

1. Technical Field

Embodiments described herein relate to an airbag apparatus mounted on a vehicle such as an automobile, and to a method for sewing a tether for the airbag or airbag apparatus. In particular, the embodiments described herein relate to an airbag apparatus and a tether sewing method for sewing a tether for restricting an airbag shape.

2. Related Art

Vehicles such as automobiles are usually equipped with airbag apparatuses for inflating and deploying airbags inside the vehicles, for example, at the time of collision or abrupt deceleration to absorb impact exerted on occupants. Various types of such airbag apparatuses have been developed and adopted. Among them are a driver-side airbag apparatus inserted into a steering wheel, a passenger-side airbag apparatus inserted into an instrument panel, a side airbag apparatus inserted into a vehicle lateral portion or a seat, a curtain airbag apparatus inserted into a door upper portion, and a knee airbag apparatus located at a position corresponding to an occupant's knee.

These airbag apparatuses each usually have: an airbag that is folded up in normal times and is inflated and deployed in an emergency; and an inflator for supplying gas to the airbag. In particular, in the case of the passenger-side airbag apparatus, an airbag inflation space is large, and people of various body types such as a child, an adult female and an adult male may sit in a passenger seat; therefore, it is required that consideration be made to bring factors such as an airbag volume, an inflation/deployment speed, an airbag internal pressure and an impact absorbing ability into balance. In terms of such requirements, a tether for restricting an airbag shape (which may also be referred to as a "strap", "belt part", "band-like body" or "band-like string", for example) may be placed inside the airbag (see JP-A-5-116575 and JP-A-7-304411, for example).

JP-A-5-116575 describes the following points. Since an airbag is primarily largely extended in an ejection direction in which gas is ejected from an inflator, i.e., in a direction toward an occupant, during an initial airbag deployment period, there arises a problem that the inflation of the airbag in vertical and lateral directions is delayed; hence, with the aim of limiting the extension of the airbag in the gas ejection direction, a strap for restricting the extension of the airbag is often provided so that the strap runs between a position in the vicinity of an inward top portion of the airbag and a position in the vicinity of an inward base portion of the airbag.

Further, JP-A-5-116575 discloses a method for fabricating a vehicle airbag in which band-like bodies are provided by integrally extending part of respective reinforcement fabrics attached to positions in the vicinities of the inner top portion and inner base portion of the airbag that is in the form of an deployed shape, and straps for restricting the deployed shape of the airbag are formed by sewing ends of the band-like bodies of the reinforcement fabrics opposed to each other. The vehicle airbag fabricating method is characterized by the following features. Flaps having set holes are formed at respective tip portions of the band-like bodies by being protruded from the tip portions to both sides; on the other hand, positioning pins are provided at a mating surface of a pair of plate-like bodies, having sewing through holes, so that the positioning pins correspond to the set holes of the band-like bodies superposed for sewing, thus providing a sewing jig. The positioning pins of the jig are inserted through the set holes of the band-like bodies which are to be sewn to each other, and then the plate-like bodies of the jig are closed to sew the ends of the band-like bodies through the sewing through holes.

JP-A-7-304411 discloses a method for fabricating an airbag main body of an airbag apparatus in which the airbag main body swells out at the time of operation of a gas generator, the airbag main body is formed by sewing edges of a front-side base fabric and a rear-side base fabric having a gas inlet, a hanging belt is sewn between the front-side base fabric and the rear-side base fabric, and a belt part tip of the hanging belt is sewn to belt catches sewn to the airbag main body. The airbag main body fabricating method is characterized by the following features. The belt part tip of the hanging belt is provided, at its positions closer to the tip than a position where a sewn portion is to be formed, with pin holes for insertion of positioning pins, the belt catches opposed to these pin holes are provided with pin holes for insertion of the positioning pins, the positioning pins formed at a sewing machine table are fitted into the pin holes of the belt catches and the pin holes of the belt part tip to determine positioning, and then the sewn portion of the belt part tip of the hanging belt is formed.

Actually, in sewing a tether such as one described above to a base fabric of an airbag, accurate fixation of the tether is enabled but pin holes remain after the sewing when the tether is fixed to the airbag with the use of positioning pins, thus making it necessary to provide a step of closing the pin holes. Therefore, for example, the airbag base fabric is deployed on a plane on a bench, an outer peripheral portion of the airbag is fixed on the bench via positioning pins, a sewing position of the tether is pointed out by a laser pointer or the like, and then the sewing of the tether is carried out. However, such a sewing method causes a problem that facilities are increased in size because the entire airbag has to be deployed on a plane, and a problem that a wrinkle is likely to occur in the airbag base fabric because a fixed portion of the airbag and a sewn portion of the tether are located away from each other.

Furthermore, in sewing ends of the tethers (band-like bodies) for restricting an airbag shape in the vehicle airbag fabricating method according to Patent Document 1 described above, the flaps having set holes are formed in the tethers (band-like bodies) and the positioning pins are inserted through the set holes, thereby enabling accurate positioning. However, no particular reference is made to sewing of the tethers (band-like bodies) to positions in the vicinity of the inner top portion of the airbag, and therefore, problems similar to those in the conventional sewing method might occur.

Moreover, in the airbag main body fabricating method according to Patent Document 2 described above, the tether (hanging belt) is sewn to the belt catches, and the positioning pins are inserted through the pin holes formed in the tether and the belt catches, thereby enabling accurate positioning. However, no particular reference is made to sewing of the airbag base fabric to the belt catches, and therefore, problems similar to those in the conventional sewing method might occur.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages.

Accordingly, it is an illustrative aspect of the present invention to provide an airbag, an airbag apparatus and a tether sewing method in which easy and accurate positioning of a tether is enabled.

According to one or more illustrative aspects of the present invention, there is provided an airbag apparatus. The airbag apparatus includes: an airbag that is folded up in a normal state and is inflated and deployed in an emergency state; and an inflator configured to supply a deployment gas to the airbag. The airbag includes: a base fabric constituting an outer shell of the airbag; a tether sewn to the base fabric and configured to restrict a shape of the airbag when the airbag is inflated and deployed by the deployment gas. The base fabric has a first pin hole therethrough in a contact region where the base fabric and the tether contacts each other, and the tether has a second pin hole therethrough in the contact region, wherein a position of the second pin hole corresponds to a position of the first pin hole. The tether has a folded back portion sewn to the tether and covering the first and second pin holes, and the respective first and second pin holes are configured to receive a positioning pin for fixing the base fabric and tether to each other.

According to one or more illustrative aspects of the present invention, there is provided a method for sewing a tether to a base fabric of an airbag that is folded up in a normal state and is inflated and deployed in an emergency state, wherein the base fabric constitutes an outer shell of the airbag, and the tether is configured to restrict a shape of the airbag when the airbag is inflated and deployed. The method includes: (a) inserting a positioning pin through a first pin hole of the base fabric in a contact region where the base fabric and the tether contacts each other; (b) inserting the positioning pin through a second pin hole of the tether in the contact region such that a position of the second pin hole corresponds to a position of the first pin hole; (c) sewing the tether to the base fabric; (d) removing the base fabric and tether from the positioning pin; (e) folding back the tether so as to cover the first and second pin holes; and (f) sewing a folded portion of the tether to the base fabric.

In the above-described airbag, airbag apparatus and tether sewing method according to the present invention, pin holes are formed in a base fabric and a tether to enable fixation of the base fabric and tether by positioning pins, and after the base fabric and the tether have been sewn, the tether is folded back and sewn to the base fabric so as to close the pin holes. Thus, even when the pin holes are provided at a connection between the base fabric and the tether, the pin holes can easily be closed by the folded back portion. Accordingly, easy and accurate positioning of the tether at a position adjacent to a sewing position of the base fabric is enabled, scale-down of facilities is enabled since it is unnecessary to expand the entire base fabric on a plane at the time of sewing of the tether, and an improvement in the quality of the airbag is enabled because a wrinkle is unlikely to occur at the time of sewing of the tether.

Further, sewing lines of the base fabric and the folded back portion are each formed into a loop, and the pin holes are formed inwardly of the loop, thereby making it possible to perform sewing so as to surround the pin holes and to effectively seal the pin holes with the folded back portion.

Furthermore, a mark is formed in the tether, thereby making it possible to easily determine positioning of the folded back portion and to perform accurate sewing. In particular, the mark is provided by a cut-out or protrusion formed at a given position of the tether, and the mark can thus be easily formed.

Moreover, the pin holes (i.e., the first and second pin holes) are formed at positions serving as asymmetric triangle vertexes, thus making it possible to reduce the occurrence of false recognition of the arrangement orientation of the tether and front and back sides of the tether with respect to the base fabric, and to effectively suppress rotation and wrinkling of the base fabric and the tether at the time of sewing.

In addition, when a plurality of the tethers are arranged in the airbag, the pin holes are arranged differently for each tether, thus making it possible to reduce the occurrence of false recognition of the tether to be connected, and to prevent a mix-up between the tethers.

Besides, even when the tether is divided into a plurality of fragments, ends of the fragments are provided with protrusions having pin holes, thereby enabling easy positioning of the fragments and accurate sewing.

Furthermore, even when the airbag has a left inflation chamber and a right inflation chamber, i.e., even when the airbag is a so-called "twin bag", the present invention enables easy and accurate positioning of the tether and is thus effective for a twin bag in which the shape of the airbag at the time of inflation and expansion is often restricted. In particular, the present invention is also easily applicable to an L-shaped tether used in a twin bag.

Other aspects and advantages of the present invention will be apparent from the following description, the drawings and the claims.

DETAILED DESCRIPTION

Figure 1:
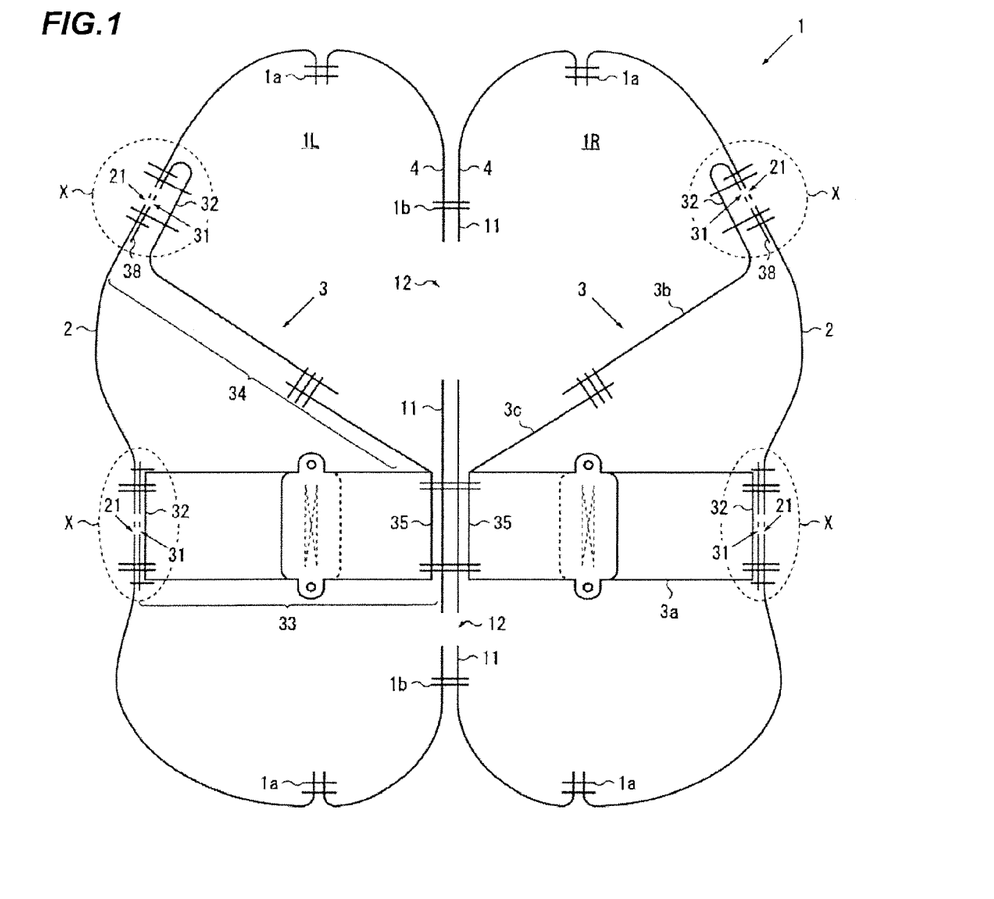
FIG. 1 is a cross-sectional view of an airbag according to a first embodiment of the present invention.
Figure 2A:
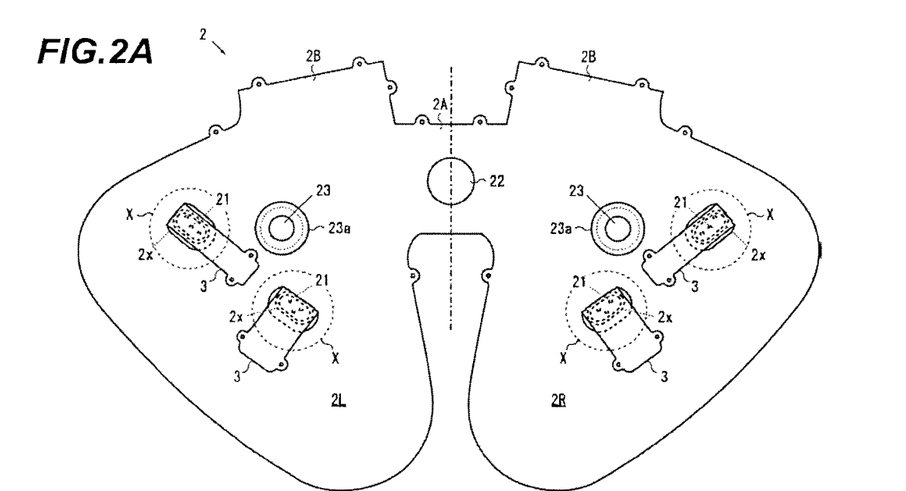
FIG. 2A is a diagram illustrating an outer panel of a base fabric deployed on a plane and serving as a component of the airbag illustrated in FIG. 1.
Figure 2B:
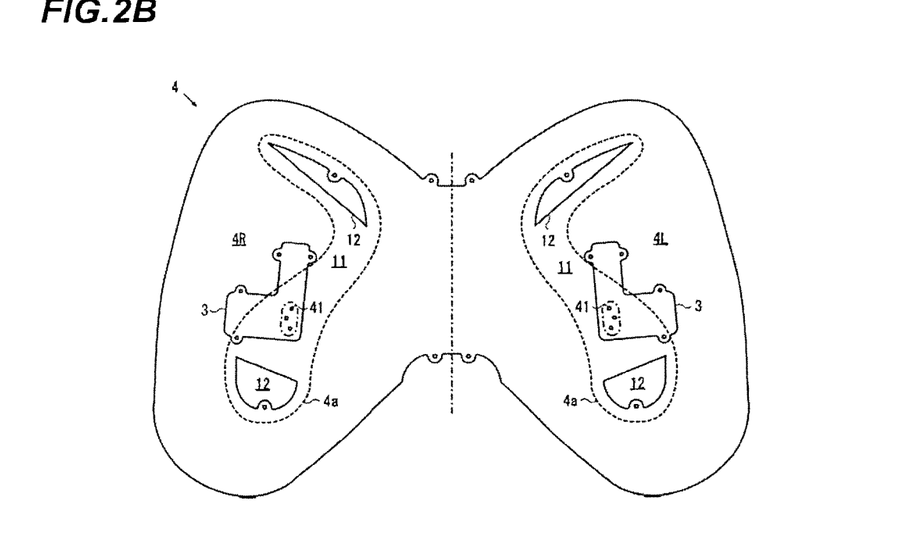
FIG. 2B is a diagram illustrating an inner panel of a base fabric deployed on a plane and serving as a component of the airbag illustrated in FIG. 1.
Figure 3A:
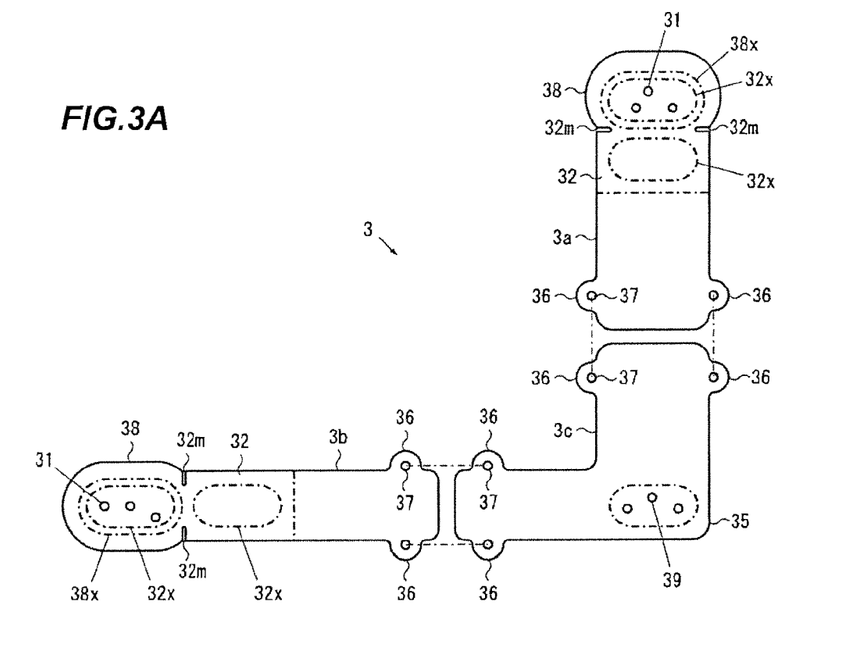
FIG. 3A is a diagram illustrating a divided state of a tether illustrated in FIG. 1 and deployed on a plane.
Figure 3B:
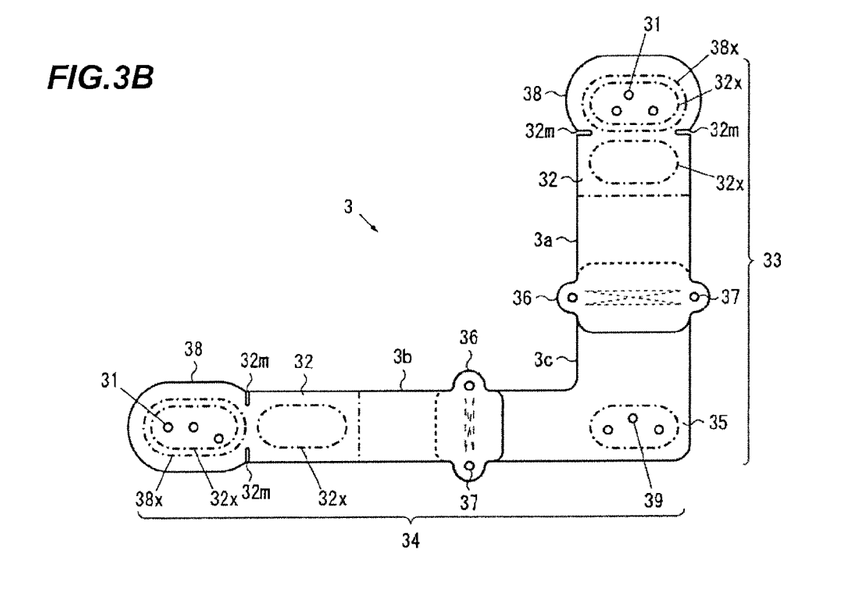
FIG. 3B is a diagram illustrating a connected state of the tether illustrated in FIG. 1 and deployed on a plane.

Hereinafter, embodiments of the present invention will be described with reference to FIG. 1 to FIGS. 8A to 8C. In the following description, FIG. 1 is a cross-sectional view of an airbag according to a first embodiment of the present invention. FIG. 2A is a diagram illustrating an outer panel of a base fabric deployed on a plane and serving as a component of the airbag illustrated in FIG. 1. FIG. 2B is a diagram illustrating an inner panel of a base fabric deployed on a plane and serving as a component of the airbag illustrated in FIG. 1. FIG. 3A is a diagram illustrating a divided state of a tether illustrated in FIG. 1 and deployed on a plane. And FIG. 3B is a diagram illustrating a connected state of the tether illustrated in FIG. 1 and deployed on a plane. Note that the airbag provided in FIG. 1 is illustrated in cross section in a state where the inflated and deployed airbag is seen from an occupant.

As illustrated in FIG. 1 to FIGS. 3A and 3B, the airbag 1 according to the first embodiment of the present invention is folded up in normal times and is inflated and deployed in an emergency. The airbag 1 is characterized by the following features. The airbag 1 has: a base fabric (outer panel 2) constituting an outer shell of the airbag 1; and tethers 3 sewn to the outer panel 2 and serving to restrict a shape of the airbag 1 at the time of inflation and deployment. The airbag 1 further has: first pin holes 21 each formed in a region of the outer panel 2 at a connection X between the outer panel 2 and the tether 3; second pin holes 31 each formed in a region of the tether 3 at the connection X between the outer panel 2 and the tether 3 so as to be located at a position corresponding to that of the associated first pin hole 21; and folded back portions 32 formed by folding back the tethers 3 and sewn to the outer panel 2 so as to cover the first and second pin holes 21 and 31. Positioning pins 5 are inserted through the first and second pin holes 21 and 31, and the outer panel 2 and the tethers 3 are thus fixed and sewn to each other. Note that in order to facilitate the understanding of the description of the invention, a gap is illustrated between the outer panel 2 and the tether 3 at each connection X in FIG. 1, but the outer panel 2 and the tethers 3 are actually sewn so as to be brought into intimate contact with each other.

For example, the airbag 1 has: a left inflation chamber 1L inflated and deployed toward the occupant's left side; and a right inflation chamber 1R inflated and deployed toward the occupant's right side. The airbag 1 further includes: a connection portion 11 through which the left inflation chamber 1L and the right inflation chamber 1R are connected to each other; and communication paths 12 which are formed in the connection portion 11 and through which the left inflation chamber 1L and the right inflation chamber 1R are communicated with each other. The foregoing airbag 1 is usually referred to as a "twin bag". Moreover, the airbag 1 has the outer panel 2 formed by the base fabric constituting the outer shell and an inner panel 4 formed by a base fabric constituting an inner shell, and edge portions of the outer panel 2 and the inner panel 4 are sewn to each other via a sewn portion 1a, thereby forming a bag body. Note that the connection portion 11 is formed by sewing opposing parts of the inner panel 4 via an annular sewn portion 1b.

As illustrated in FIG. 2A, for example, the outer panel 2 has: a left outer panel 2L constituting part of the left inflation chamber 1L; a right outer panel 2R constituting part of the right inflation chamber 1R; a base end portion 2A through which the left outer panel 2L and the right outer panel 2R are connected to each other; and a pair of back panels 2B, 2B constituting a back portion of the airbag 1. Note that the outer panel 2 illustrated in FIG. 2A is in a state where the tethers 3 are partially sewn.

The base end portion 2A is provided with an opening 22 into which a gas generator (inflator) is inserted. The foregoing base end portion 2A serves as a region connected to a vehicle body such as an instrument panel, for example. Further, the left outer panel 2L and the right outer panel 2R may each be provided with a vent hole 23 serving as an opening through which gas inside the airbag 1 is discharged. A reinforcement fabric 23a is usually sewn to an outer edge of each vent hole 23. Furthermore, the back panels 2B are regions that are not sewn to the inner panel 4 when the bag body is formed by sewing the outer panel 2 and the inner panel 4 to each other. The foregoing back panels 2B are regions through which portions of the outer panel 2 are connected to each other when the bag body is folded into two parts to provide a twin bag, thus forming the bag body with no gap.

Moreover, the outer panel 2 (including the left outer panel 2L and the right outer panel 2R) has the first pin holes 21 formed in the connections X between the outer panel 2 and the tethers 3. For example, the number of the first pin holes 21 formed in each connection X is three. However, the number of the first pin holes 21 formed in each connection X is not limited to three, but at least two or more first pin holes 21 may be formed in each connection X as long as consideration is given to the fixation of the outer panel 2. Further, when sewing is performed for each connection X, the first pin holes 21 may be arranged so that at least two or more first pin holes 21 are provided in each connection X, and when sewing is performed for each of the left outer panel 2L and the right outer panel 2R, the first pin holes 21 may be arranged so that a total of at least two or more first pin holes 21 are provided in each of the panels 2L and 2R. In particular, as illustrated in the drawing, the first pin holes 21 are formed at positions serving as asymmetric triangle vertexes, thereby making it possible to reduce the occurrence of false recognition of the orientation and front and back sides of the outer panel 2 and to effectively suppress rotation and wrinkling of the outer panel 2 at the time of sewing of each connection X.

Furthermore, sewing lines in the connections X (scheduled sewing lines 2x indicated by alternate long and short dashed lines in the drawing) are each formed into a loop, and the first pin holes 21 are formed inwardly of the sewing lines (scheduled sewing lines 2x). As long as the sewing lines (scheduled sewing lines 2x) are each formed into a loop constituting an endless shape, the sewing lines (scheduled sewing lines 2x) may each have a circular or elliptic shape or may each have a polygonal shape. Besides, the scheduled sewing lines 2x have double structures as illustrated in FIG. 2A, for example. One of each pair of the scheduled sewing lines 2x (e.g., the outer scheduled sewing line 2x) serves as the scheduled sewing line 2x along which the tether 3 is fixed to the outer panel 2, and the other one of each pair of the scheduled sewing lines 2x (e.g., the inner scheduled sewing line 2x) serves as the scheduled sewing line 2x along which the folded back portion 32 of the tether 3 is fixed to the outer panel 2. As described above, the first pin holes 21 are formed inwardly of the sewing lines (scheduled sewing lines 2x), thereby making it possible to perform sewing so that the first pin holes 21 are surrounded and to effectively seal the first pin holes 21 with the folded back portions 32.

As illustrated in FIG. 2B, for example, the inner panel 4 has: a left inner panel 4L constituting part of the left inflation chamber 1L; and a right inner panel 4R constituting part of the right inflation chamber 1R. The left inner panel 4L and the right inner panel 4R are each provided with a pair of the communication paths 12. A broken line surrounding each pair of the communication paths 12 serves as a scheduled sewing line 4a by which the connection portion 11 is defined. The inner panel 4 is folded into two parts so that the communication paths 12 of the left inner panel 4L correspond to the associated communication paths 12 of the right inner panel 4R, and sewing is performed along the scheduled sewing line 4a, thereby forming the sewn portion 1b; then, the inner panel 4 is sewn to the outer panel 2 to form a bag body, thereby providing a twin bag. Further, a region surrounded by the scheduled sewing line 4a constitutes the connection portion 11. The tethers 3 are partially sewn to regions of the connection portion 11 where an inner surface of the airbag 1 is formed. The tethers 3 each have pin holes corresponding to pin holes 41 formed in the inner panel 4, and positioning pins are inserted therethrough to sew the tethers 3 to the inner panel 4. In this case, since the connection portion 11 is sealed along the scheduled sewing line 4a, the pin holes 41 do not have to be sealed by other means.

Furthermore, the formation of the communication paths 12 is not limited to the one illustrated in the drawing, but one communication path 12 or three or more communication paths 12 may be formed in each of the left inner panel 4L and the right inner panel 4R. Moreover, the shape of each communication path 12 may be changed as appropriate in accordance with criteria such as the type of the airbag 1, mounting position and mounting angle thereof, a vehicle body shape (e.g., an angle of an instrument panel, an angle of a windshield, etc.) and an angle of entry of an occupant (or a dummy doll) into the airbag 1 (e.g., a hollow portion of the twin bag). Note that when the left inner panel 4L and the right inner panel 4R are each provided with a pair of the communication paths 12 as illustrated in the drawing, opposing sides thereof are linearly formed, thereby making it possible to stabilize tension of the connection portion 11 and to suppress deformation of the communication paths 12.

Each of the tethers 3 is a component for restricting the shape of the airbag 1 at the time of inflation and deployment. When a means for restricting the shape of the airbag 1 at the time of inflation and deployment is not used, the airbag 1 is inflated and deployed in a lateral width direction (i.e., in a lateral direction), and the airbag 1 will be inflated and deployed so as to be roughly spherical in shape. Further, when the airbag 1 is inflated and deployed in the lateral width direction (i.e., in the lateral direction), an access distance of the airbag 1 in an inflation and deployment direction (in a direction toward the occupant) is also reduced. To cope with this, the tether 3 for restricting the shape of the airbag 1 at the time of inflation and deployment is needed. The foregoing tether 3 is often formed by a band-like base fabric, and may also be referred to as a "strap", "belt part", "band-like body" or "band-like string", for example.

In the airbag 1 (twin bag) such as one illustrated in FIG. 1, the left inflation chamber 1L and the right inflation chamber 1R have the same shape, and therefore, the tethers 3 having the same shape are connected thereto. When the left inflation chamber 1L and the right inflation chamber 1R have different shapes, the tethers 3 suitable for the shapes of the left inflation chamber 1L and the right inflation chamber 1R may be connected. Furthermore, as illustrated in FIG. 1, for example, the tethers 3 include: first tethers 33 for restricting inflation and deployment of the airbag 1 (inflation chambers 1L and 1R) in the lateral width direction (lateral direction); and second tethers 34 for restricting inflation and deployment of the airbag 1 in an inflation direction (in a direction toward the occupant). Moreover, as illustrated in FIG. 3B, the tethers 3 (including the first and second tethers 33 and 34) are each defined by the respective sides of the base fabric formed into an L shape, and bent portions 35 of the tethers 3 are connected to the connection portion 11.

As illustrated in FIGS. 3A and 3B, each tether 3 is divided into a plurality of tether portions 3a, 3b and 3c, and ends of the tether portions 3a, 3b and 3c are superposed and sewn, thereby providing a unified structure. As described above, each tether 3 is divided into a plurality of the tether portions 3a, 3b and 3c, thus making it possible to easily perform sewing of the outer panel 2 and the inner panel 4 (i.e., formation of the sewn portion 1a).

Specifically, each tether 3 is divided into: the first tether portion 3a constituting a tip portion of the first tether 33; the second tether portion 3b constituting a tip portion of the second tether 34; and the L-shaped third tether portion 3c constituting a base end portion of the first and second tethers 33 and 34. Further, at ends of the tether portions 3a, 3b and 3c, constituting a connection between the first tether portion 3a and the third tether portion 3c and a connection between the second tether portion 3b and the third tether portion 3c, there are provided: pairs of protrusions 36 formed at positions that correspond to each other when the ends are superposed; and third pin holes 37 formed at positions that correspond to each other when the protrusions 36 are superposed. The protrusions 36 having the third pin holes 37 are regions that are formed in order to easily determine positioning of the tether portions 3a, 3b and 3c when the first tether portion 3a and the second tether portion 3b are connected to the third tether portion 3c, and to perform accurate sewing; hence, at least one pair of the protrusions 36 may be formed at lateral portions of each end.

Furthermore, a tip portion 38 of the first tether portion 3a (i.e., a region constituting the connection X between the first tether 33 and the outer panel 2) is provided with the second pin holes 31 for insertion of the positioning pins. The second pin holes 31 are arranged so that the second pin holes 31 correspond to the first pin holes 21 formed in a region of the outer panel 2, to which the associated first tether 33 is to be connected. Accordingly, when the tip portion 38 is sewn, the positioning pins are allowed to be inserted through the first and second pin holes 21 and 31, and accurate positioning of the outer panel 2 and the tether 3 is enabled. In particular, the second pin holes 31 are formed at positions serving as asymmetric triangle vertexes, thereby making it possible to reduce the occurrence of false recognition of the orientation and front and back sides of the first tether 33, and to effectively suppress rotation and wrinkling of the first tether 33 at the time of sewing of each connection X.

Moreover, a tip portion 38 of the second tether portion 3b (i.e., a region constituting the connection X between the second tether 34 and the outer panel 2) is also provided with the second pin holes 31 for insertion of the positioning pins similarly to the first tether 33. As illustrated in FIG. 3A, the second pin holes 31 of the first and second tethers 33 and 34 are formed so that the arrangement of the second pin holes 31 of the first tether 33 is different from that of the second pin holes 31 of the second tether 34. As described above, when a plurality of tethers (the first and second tethers 33 and 34 in this embodiment) are arranged in the airbag 1, the pin holes (second pin holes 31 in this embodiment) are arranged differently for each tether, thereby making it possible to reduce the occurrence of false recognition of the tether to be connected, and to prevent a mix-up between the first and second tethers 33 and 34.

Further, an intermediate portion of the third tether portion 3c (i.e., the L-shaped bent portion 35) is provided with fourth pin holes 39 for insertion of positioning pins. Similarly to the second pin holes 31, the foregoing fourth pin holes 39 are also formed at positions serving as asymmetric triangle vertexes, thereby making it possible to reduce the occurrence of false recognition of the orientation and front and back sides of the third tether portion 3c, and to effectively suppress rotation and wrinkling of the third tether portion 3c at the time of sewing. In addition, the fourth pin holes 39 are arranged differently from the second pin holes 31, thereby making it possible to reduce the occurrence of false recognition of the third tether portion 3c, i.e., a mix-up between the third tether portion 3c and the other tether portions 3a and 3b.

Besides, the first and second tethers 33 and 34 have the folded back portions 32 at regions thereof adjacent to the tip portions 38. The foregoing folded back portions 32 are regions that are folded back over the tip portions 38 and sewn to the outer panel 2 along scheduled sewing lines 32x after the tip portions 38 have been sewn to the outer panel 2 along scheduled sewing lines 38x in connecting the first and second tethers 33 and 34 to the outer panel 2. These scheduled sewing lines 38x and 32x are each formed into a loop similarly to the scheduled sewing lines 2x of the outer panel 2, and the second pin holes 31 are formed inwardly of the scheduled sewing lines 38x and 32x. As described above, the second pin holes 31 are formed inwardly of the sewing lines (i.e., the scheduled sewing lines 38x and 32x), thus making it possible to perform sewing so that the second pin holes 31 are surrounded and to effectively seal the second pin holes 31 with the folded back portions 32.

Further, the first and second tethers 33 and 34 have marks 32m for identifying positions of the folded back portions 32. Specifically, the marks 32m are cut-outs formed along folding lines of the folded back portions 32, which are located between the tip portions 38 and the folded back portions 32. As described above, the marks 32m are formed in the tethers 3 (i.e., the first and second tethers 33 and 34), thereby making it possible to easily determine positioning of the folded back portions 32 and to perform accurate sewing. Note that the cut-out shape of each mark 32m is not limited to the illustrated shape, but each mark 32m may have a cut-out shape formed by two sides of a triangle or a linearly cut shape.

Next, a method for sewing the above-described tether 3 to the outer panel 2 will be described. In the following description, FIG. 4A is an explanatory diagram illustrating a base fabric fixation step of a tether sewing method according to the present invention, FIG. 4B is an explanatory diagram illustrating a tether fixation step of the tether sewing method according to the present invention, FIG. 4C is an explanatory diagram illustrating a first sewing step of the tether sewing method according to the present invention, FIG. 4D is an explanatory diagram illustrating a folding back step of the tether sewing method according to the present invention, FIG. 4E is an explanatory diagram illustrating a second sewing step of the tether sewing method according to the present invention, and FIG. 4F is a diagram illustrating the outer panel deployed on a plane after the tether has been sewn.

As illustrated in FIGS. 4A to 4E, the sewing method for the tether 3 according to the present invention is used in sewing the tether 3 for restricting the shape of the airbag 1 at the time of inflation and deployment to the base fabric (e.g., the outer panel 2) serving as a component of the airbag 1 that is folded up in normal times and is inflated and deployed in an emergency. The tether sewing method includes: the base fabric fixation step for inserting the positioning pins 5 through the first pin holes 21 formed in a region of the outer panel 2 at the connection X between the outer panel 2 and the tether 3; the tether fixation step for inserting the positioning pins 5 through the second pin holes 31 formed in a region of the tether 3 at the connection X between the outer panel 2 and the tether 3; the first sewing step for sewing the tether 3 to the outer panel 2; the tether folding back step for removing the sewn outer panel 2 and tether 3 from the positioning pins 5 and for folding back the tether 3 so as to cover the first and second pin holes 31 and 32; and the second sewing step for sewing the folded back tether 3 to the outer panel 2.

Figure 4A:
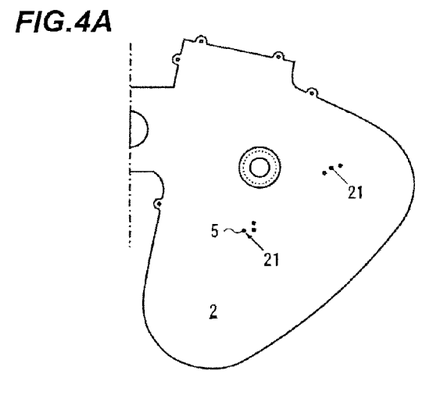
FIG. 4A is an explanatory diagram illustrating a base fabric fixation step of a tether sewing method according to the present invention.

As illustrated in FIG. 4A, in the base fabric fixation step, the outer panel 2, which is the base fabric constituting the outer shell of the airbag 1, is deployed on a plane on a given work bench, and the positioning pins 5 are inserted through the first pin holes 21 located at sewing positions, thereby fixing the outer panel 2 onto the work bench. In this case, the description is made on the assumption that the first tether portion 3a included in the first tether 33 is connected to the outer panel 2. Note that when the first and second tethers 33 and 34 are processed simultaneously in a concurrent manner, the positioning pins 5 may be inserted through the first pin holes 21 located in both of a region where the first tether 33 (first tether portion 3a) is to be connected and a region where the second tether 34 (second tether portion 3b) is to be connected. Note that although a half of the surface of the outer panel 2 is deployed on a plane in the diagram, a work bench, on which the outer panel 2 can be deployed on a plane only at positions desired to be sewn, may be used.

Figure 4B:
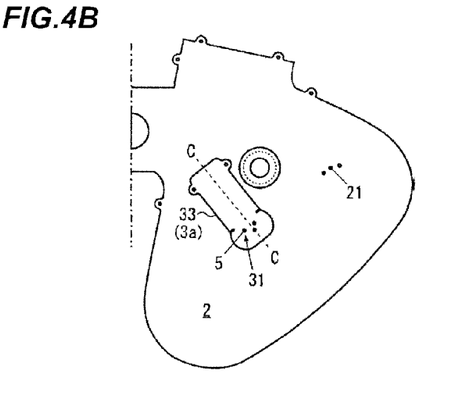
FIG. 4B is an explanatory diagram illustrating a tether fixation step of the tether sewing method according to the present invention.
Figure 4C:
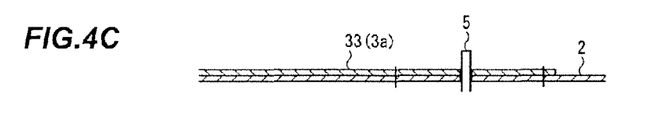
FIG. 4C is an explanatory diagram illustrating a first sewing step of the tether sewing method according to the present invention.
Figure 4D:
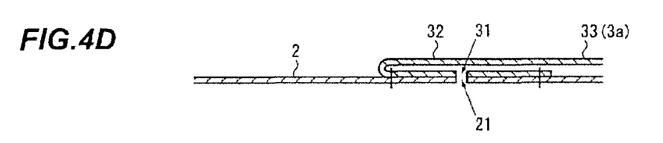
FIG. 4D is an explanatory diagram illustrating a folding back step of the tether sewing method according to the present invention.
Figure 4E:
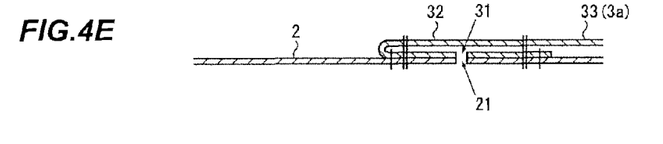
FIG. 4E is an explanatory diagram illustrating a second sewing step of the tether sewing method according to the present invention.
Figure 4F:
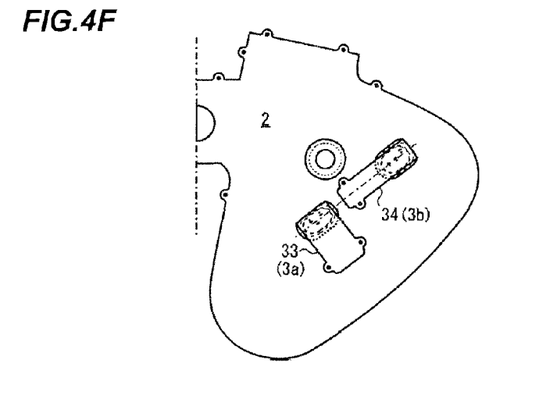
FIG. 4F is a diagram illustrating the outer panel deployed on a plane after the tether has been sewn.

As illustrated in FIG. 4B, in the tether fixation step, the positioning pins 5 are inserted through the first tether 33 through the outer panel 2 fixed onto the work bench, thereby fixing the first tether 33 onto the work bench. In this case, since the first tether 33 is provided with the second pin holes 31 formed at positions corresponding to those of the first pin holes 21, accurate positioning of the first tether 33 with respect to the outer panel 2 is enabled.

Further, the first and second pin holes 21 and 31 are formed at positions serving as asymmetric triangle vertexes, thus preventing mistakes about the orientation and front and back sides of the first tether 33 with respect to the outer panel 2. Furthermore, the first and second pin holes 21 and 31 formed at the connection X of the first tether 33 are arranged differently from the first and second pin holes 21 and 31 formed at the connection X of the other tether 3 (e.g., the second tether 34), thus eliminating mistakes about the position of the outer panel 2 fixed onto the work bench and preventing a mix-up between the first and second tethers 33 and 34.

As illustrated in FIG. 4C, in the first sewing step, the first tether 33 positioned on the outer panel 2 is sewn to the outer panel 2. FIG. 4C is a cross-sectional view taken along the line C-C in FIG. 4B. Note that the illustration of the work bench is omitted. Specifically, in the foregoing first sewing step, sewing is performed along the outer scheduled sewing line 2$x$ illustrated in FIG. 2A and along the scheduled sewing line 38$x$ illustrated in FIG. 3A, thereby connecting the outer panel 2 and the first tether 33 to each other.

As illustrated in FIG. 4D, in the tether folding back step, the first tether 33 sewn to the outer panel 2 is folded back. In this case, since the first tether 33 has already been sewn to the outer panel 2, the position of the first tether 33 will not be deviated even when the first tether 33 is removed from the positioning pins 5. Further, the first tether 33 is folded back so as to seal the first and second pin holes 21 and 31 with the folded back portion 32. In this state, the positioning of the first tether 33 and the outer panel 2 is determined by any fixation means (e.g., a frame body or the like surrounding the connection X).

As illustrated in FIG. 4E, in the second sewing step, the folded back portion 32 of the first tether 33 is sewn to the outer panel 2. Specifically, in the foregoing second sewing step, sewing is performed along the inner scheduled sewing line 2$x$ illustrated in FIG. 2A and along the scheduled sewing line 32$x$ illustrated in FIG. 3A, thereby connecting the outer panel 2 and the folded back portion 32 to each other. Since the scheduled sewing line 2$x$ and the scheduled sewing line 32$x$ are each formed into a loop, the second sewing step may also serve to perform sewing so as to surround the first and second pin holes 21 and 31. The foregoing sewing enables closing and effective sealing of the first and second pin holes 21 and 31 by the folded back portion 32 having no pin hole. Note that the scheduled sewing line 38$x$ along which sewing is performed in the first sewing step may be any line by which positioning of the first tether 33 with respect to the outer panel 2 is enabled, and the scheduled sewing line 38$x$ does not necessarily have to be formed into a loop.

After the sewing of the first tether 33 has been finished by the above-described sewing method for the tether 3, the second tether 34 is sewn by a similar procedure. FIG. 4F illustrates a state where the first and second tethers 33 and 34 are sewn to the outer panel 2. Furthermore, although not illustrated, the third tether portion 3$c$ is sewn to the inner panel 4 (see FIG. 2B), the first tether portion 3$a$ and the third tether portion 3$c$ are sewn, the second tether portion 3$b$ and the third tether portion 3$c$ are sewn, and then outer peripheral portions of the outer panel 2 and the inner panel 4 are sewn, thereby finally forming the airbag 1.

Figure 5A:
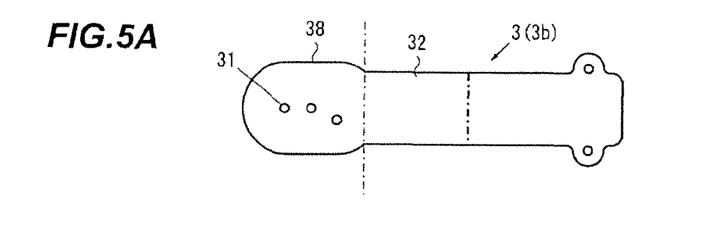
FIG. 5A is a diagram illustrating a first variation of the tether.
Figure 5B:
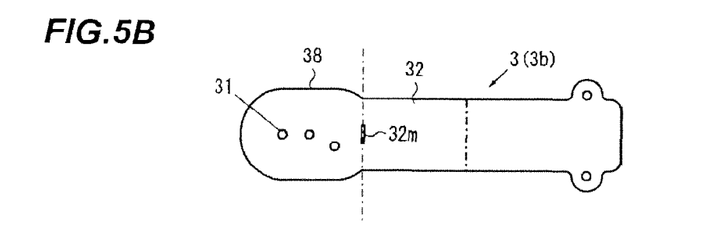
FIG. 5B is a diagram illustrating a second variation of the tether.
Figure 5C:
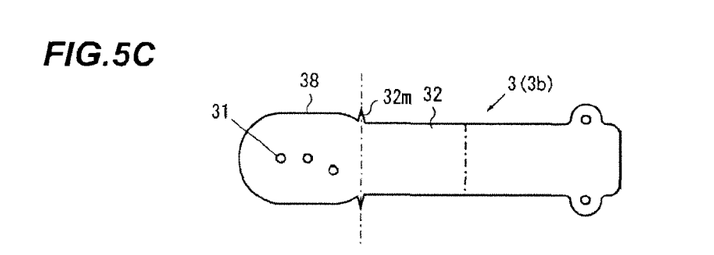
FIG. 5C is a diagram illustrating a third variation of the tether.
Figure 5D:
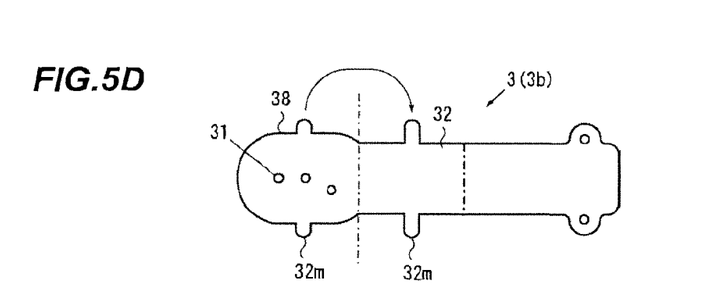
FIG. 5D is a diagram illustrating a fourth variation of the tether.
Figure 5E:
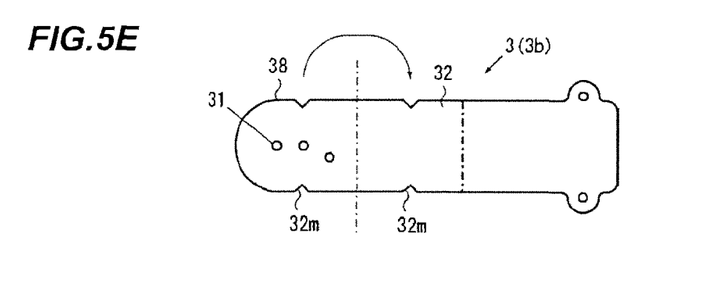
FIG. 5E is a diagram illustrating a fifth variation of the tether.

Next, variations of the above-described tether 3 will be described. In the following description, FIG. 5A is a diagram illustrating a first variation of the tether, FIG. 5B is a diagram illustrating a second variation of the tether, FIG. 5C is a diagram illustrating a third variation of the tether, FIG. 5D is a diagram illustrating a fourth variation of the tether, and FIG. 5E is a diagram illustrating a fifth variation of the tether. Note that the tether 3 illustrated in each of these diagrams is equivalent to the second tether portion 3$b$ included in the second tether 34.

As illustrated in FIG. 5A, in the first variation of the tether 3, no mark 32$m$ is provided. Even when no mark 32$m$ is provided as described above, grasping of the folding line is enabled without any mark 32$m$ as long as the tip portion 38 is formed so as to be wider than the folded back portion 32.

As illustrated in FIG. 5B, in the second variation of the tether 3, the mark 32$m$ is formed at an approximate center portion of the tether 3 instead of lateral portions of the tether 3. Even when a cut-out constituting the mark 32$m$ is formed at an approximate center portion of the tether 3 as described above, easy positioning of the folded back portion 32 is enabled. Note that the mark 32$m$ may be provided by forming a plurality of cut-outs along the folding line, or the cut-out may have a linearly cut shape.

As illustrated in FIG. 5C, in the third variation of the tether 3, the marks 32$m$ are formed by protrusions instead of the cut-outs illustrated in FIGS. 3A and 3B. Even when the marks 32$m$ are the protrusions formed along the folding line of the folded back portion 32 as described above, easy positioning of the folded back portion 32 is enabled.

As illustrated in FIG. 5D, in the fourth variation of the tether 3, the marks 32$m$ are provided by two pairs of protrusions formed at positions that correspond to each other when the folded back portion 32 is folded back. Although one pair of the marks 32$m$ are formed at each lateral portion of the tether 3 in this variation, the marks 32$m$ may be formed by one pair of protrusions formed at least at one of the lateral portions. Also in such a structure, easy positioning of the folded back portion 32 is enabled.

As illustrated in FIG. 5E, in the fifth variation of the tether 3, the marks 32$m$ are provided by two pairs of cut-outs formed at positions that correspond to each other when the folded back portion 32 is folded back. Although one pair of the marks 32$m$ are formed at each lateral portion of the tether 3 in this variation, the marks 32$m$ may be formed by one pair of cut-outs formed at least at one of the lateral portions. Also in such a structure, easy positioning of the folded back portion 32 is enabled. The fifth variation is effective when the tip portion 38 and the folded back portion 32 have the same width as illustrated in this diagram.

Figure 6A:
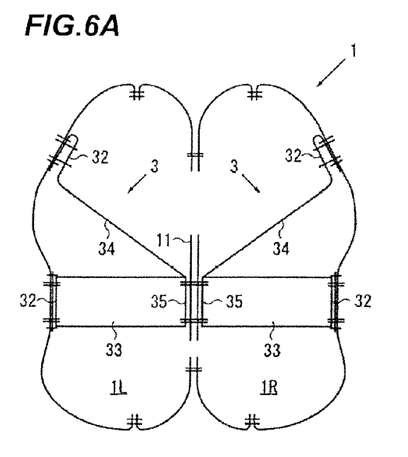
FIG. 6A is a diagram illustrating a second embodiment of the airbag according to the present invention.
Figure 6B:
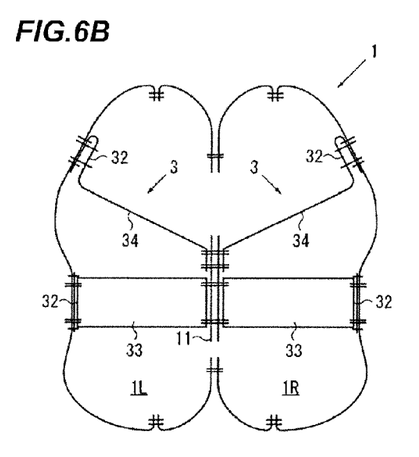
FIG. 6B is a diagram illustrating a third embodiment of the airbag according to the present invention.
Figure 6C:
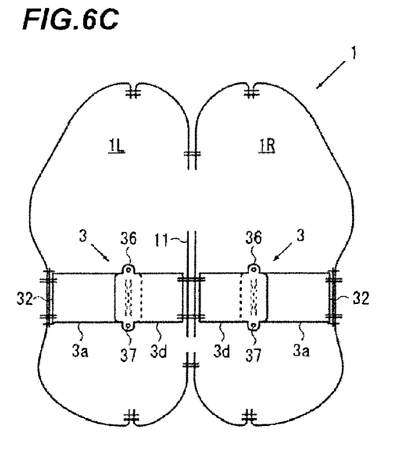
FIG. 6C is a diagram illustrating a fourth embodiment of the airbag according to the present invention.
Figure 6D:
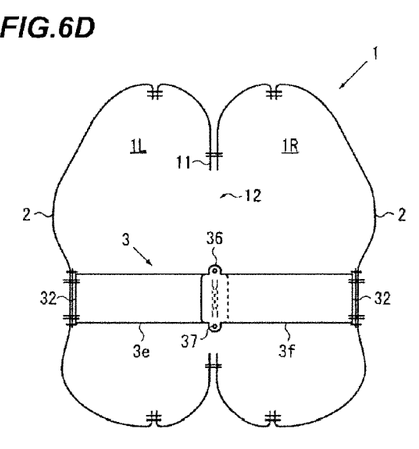
FIG. 6D is a diagram illustrating a fifth embodiment of the airbag according to the present invention.

Next, other embodiments of the airbag 1 according to the present invention will be described. In the following description, FIGS. 6A to 6D are diagrams illustrating other embodiments of the airbag according to the present invention. Specifically, FIG. 6A illustrates a second embodiment of the airbag according to the present invention, FIG. 6B illustrates a third embodiment of the airbag according to the present invention, FIG. 6C illustrates a fourth embodiment of the airbag according to the present invention, and FIG. 6D illustrates a fifth embodiment of the airbag according to the present invention. Note that components similar to those of the airbag 1 according to the first embodiment illustrated in FIG. 1 are identified by the same reference characters, and redundant description thereof will be omitted.

In the airbag 1 according to the second embodiment illustrated in FIG. 6A, each tether 3 is not divided into a plurality of tether portions but is formed by respective sides of a single base fabric having an L shape. For example, a short side of the L shape constitutes the first tether 33 and a long side of the L shape constitutes the second tether 34.

In the airbag 1 according to the third embodiment illustrated in FIG. 6B, the first and second tethers 33 and 34 are formed by different base fabrics. Similarly to the first embodiment, ends of the first and second tethers 33 and 34 are connected to the inner surface of the outer panel 2 and the connection portion 11 of the inner panel 4.

In the airbag 1 according to the fourth embodiment illustrated in FIG. 6C, each tether 3 is formed by an I-shaped base fabric equivalent to the first tether 33. Each tether 3 is divided into the first tether portion 3$a$ and fourth tether portion 3$d$ at its intermediate portion, and a connection between the first tether portion 3$a$ and fourth tether portion 3$d$ is provided with the protrusions 36 having the third pin holes 37. Note that each tether 3 may be formed by a single I-shaped base fabric instead of being divided.

In the airbag 1 according to the fifth embodiment illustrated in FIG. 6D, one end of the tether 3 is connected to an inner surface of the outer panel 2, constituting the left inflation chamber 1L, and the other end of the tether 3 is connected to an inner surface of the outer panel 2, constituting the right inflation chamber 1R. In this embodiment, the tether 3 is formed by I-shaped base fabrics, and instead of being connected to the connection portion 11, the tether 3 is passed through the communication path 12 to connect parts of the outer panel 2 to each other. Also in such a structure, restriction of the shape of the airbag 1 in the lateral width direction at the time of inflation and deployment is enabled. Further, the tether 3 is divided into a fifth tether portion 3e and a sixth tether portion 3f at its intermediate portion, and a connection between the fifth tether portion 3e and the sixth tether portion 3f is provided with the protrusions 36 having the third pin holes 37. Note that the tether 3 may be formed by a single I-shaped base fabric instead of being divided. Furthermore, when a plurality of the tethers 3 are provided, some of the tethers 3 may be passed through the communication path 12 so as to be connected to the outer panel 2, and some of the tethers 3 may be connected to the connection portion 11.

Figure 7:
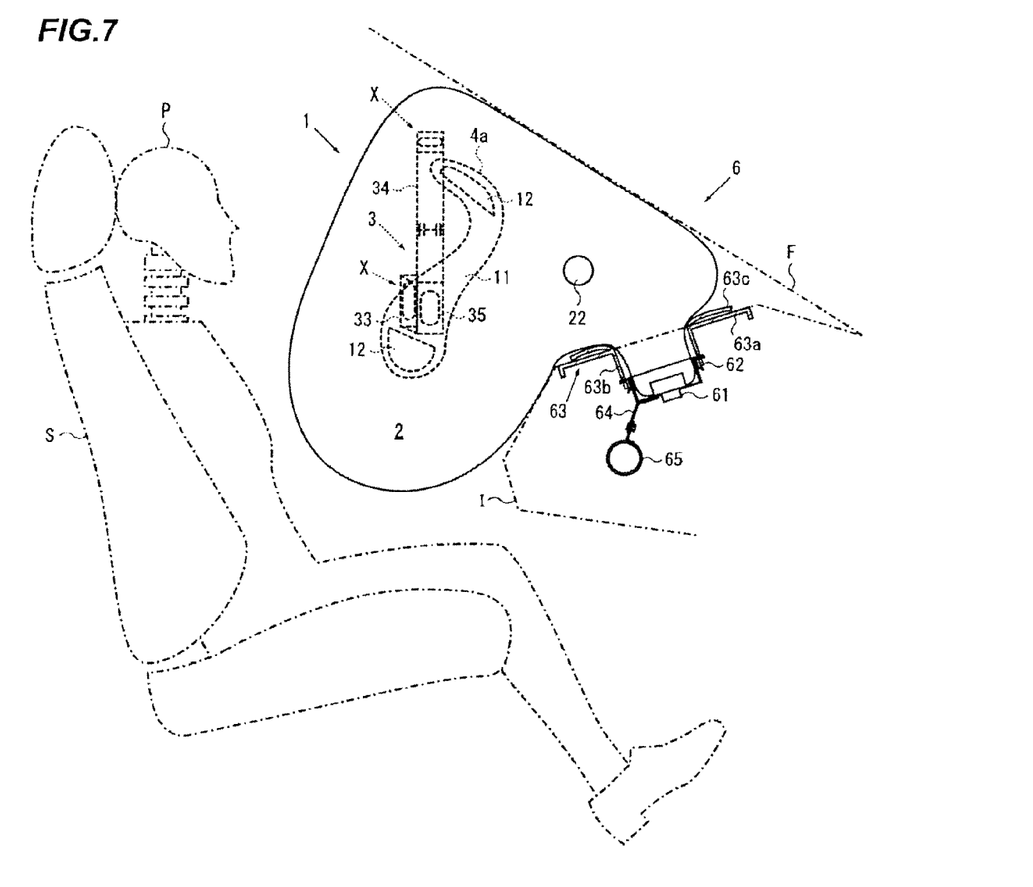
FIG. 7 is a cross-sectional view of an airbag apparatus according to the first embodiment of the present invention.
Figure 8A:
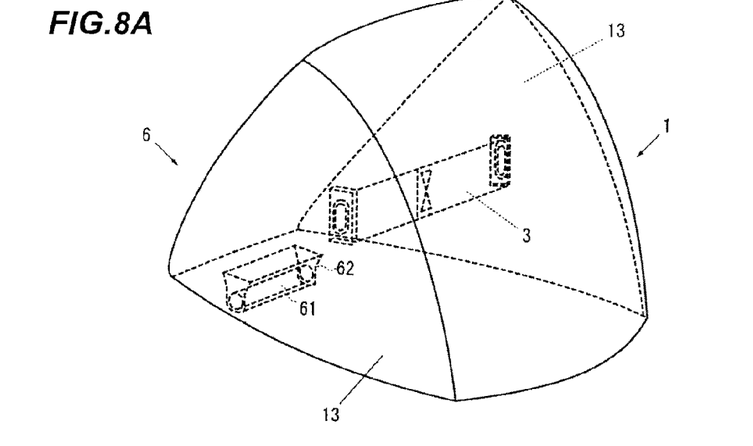
FIG. 8A is a diagram illustrating a second embodiment of the airbag apparatus according to the present invention.
Figure 8B:
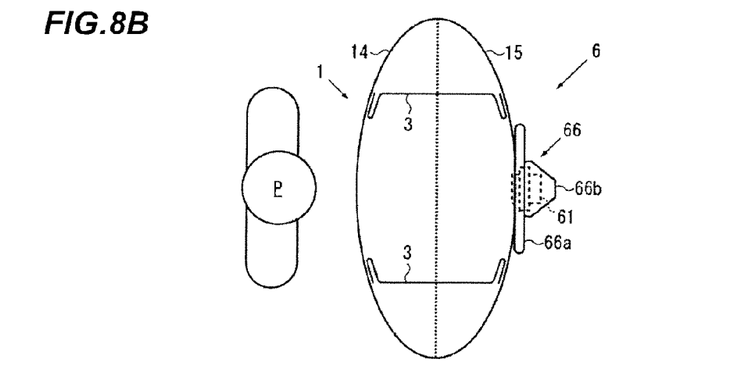
FIG. 8B is a diagram illustrating a third embodiment of the airbag apparatus according to the present invention.
Figure 8C:
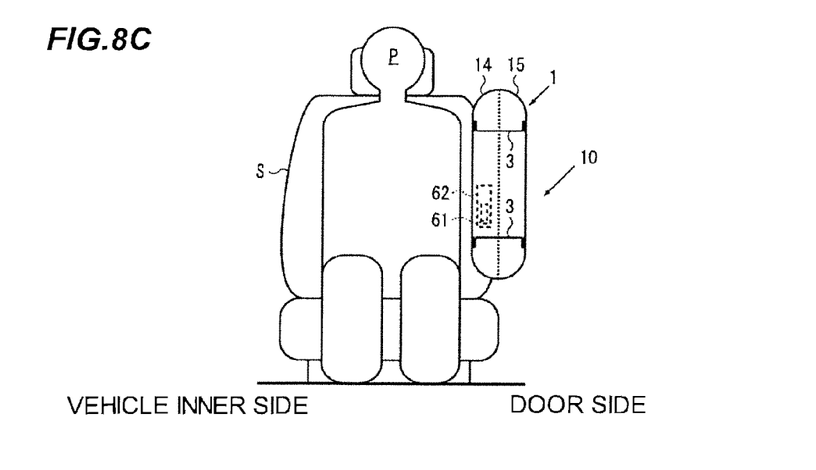
FIG. 8C is a diagram illustrating a fourth embodiment of the airbag apparatus according to the present invention.

Next, an airbag apparatus according to the present invention will be described. In the following description, FIG. 7 is a cross-sectional view of an airbag apparatus according to the first embodiment of the present invention. Further, FIGS. 8A to 8C are diagrams illustrating other embodiments of the airbag apparatus according to the present invention. Specifically, FIG. 8A illustrates a second embodiment of the airbag apparatus according to the present invention, FIG. 8B illustrates a third embodiment of the airbag apparatus according to the present invention, and FIG. 8C illustrates a fourth embodiment of the airbag apparatus according to the present invention.

As illustrated in FIG. 7, the airbag apparatus 6 according to the first embodiment of the present invention has: an airbag 1 that is folded up in normal times and is inflated and deployed in an emergency; and an inflator 61 for supplying gas to the airbag 1. The airbag 1 has: an outer panel 2 formed by a base fabric constituting an outer shell of the airbag 1; and tethers 3 sewn to the outer panel 2 and serving to restrict a shape of the airbag 1 at the time of inflation and deployment. The airbag 1 further has: first pin holes 21 (see FIG. 1 or FIGS. 2A and 2B) each formed in a region of the outer panel 2 at a connection X between the outer panel 2 and the tether 3; second pin holes 31 (see FIG. 1 or FIGS. 3A and 3B) each formed in a region of the tether 3 at the connection X between the outer panel 2 and the tether 3 so as to be located at a position corresponding to that of the associated first pin hole 21; and folded back portions 32 (see FIG. 1 or FIGS. 3A and 3B) each formed by folding back the tether 3 and sewn to the outer panel 2 so as to cover the first and second pin holes 21 and 31.

The above-described airbag apparatus 6 is a so-called "passenger-side airbag apparatus" in which the airbag 1 is inflated and deployed toward space surrounded by an occupant P, a windshield F and an instrument panel I. The foregoing airbag apparatus 6 is usually incorporated into the instrument panel I located in front of a passenger's seat. Specifically, the airbag apparatus 6 has: a retainer 62 for containing the airbag 1; and an airbag cover 63 engaged with the retainer 62 and constituting a vehicle interior surface. Note that the occupant P illustrated in FIG. 7 is intended to represent a dummy doll made in imitation of an adult female sitting in a seat S.

FIG. 7 illustrates a state where the airbag 1 has been inflated and deployed, but in a state where the airbag 1 is not yet inflated and deployed, a surface of the airbag cover 63 constitutes part of the instrument panel I. Furthermore, the airbag cover 63 has: a plate-like portion 63a constituting the vehicle interior surface; and an inner case 63b located at the rear of the plate-like portion 63a and constituting an inflation and deployment path for the airbag 1. The plate-like portion 63a is provided with a door portion 63c formed so as to be torn open at the time of inflation and deployment of the airbag 1.

The retainer 62 is engaged, via a hook connected to its lateral portion, with an engagement hole formed in the inner case 63b, and is connected to a fixing member 65 via a connecting member 64. Note that structures of the inflator 61, the retainer 62, the airbag cover 63, the connecting member 64 and the fixing member 65 are not limited to the illustrated ones, but structures similar to those that have conventionally been used may be used.

Furthermore, as the airbag 1, the airbag 1 according to the first embodiment of the present invention illustrated in FIG. 1 to FIGS. 3A and 3B is applied. The application of the foregoing airbag 1 achieves an outstanding effect such as easy and accurate positioning of the tether 3 at a position adjacent to a sewing position of the outer panel 2. Note that the variations of the tether 3 illustrated in FIGS. 5A to 5E may be used in the airbag 1, and the alternative embodiments illustrated in FIGS. 6A to 6D may also be applied as the airbag 1.

In the airbag apparatus 6 according to the second embodiment illustrated in FIG. 8A, the airbag 1 is changed to a typical passenger-side airbag (i.e., a so-called "single bag") that is not a twin bag. Even when the airbag 1 is a single bag, the present invention may be applied as long as the tether 3 for restricting the shape of the airbag 1 at the time of inflation and deployment is provided. In this embodiment, ends of the tether 3 are connected to lateral panels 13 formed by base fabrics constituting an outer shell of the airbag 1. Moreover, the tether 3 is not limited to the one that restricts the shape of the airbag 1 in a lateral width direction, but the tether 3 may restrict the shape of the airbag 1 in a vertical direction and/or in an inflation and deployment direction. The tether 3 may be divided into a plurality of tether portions but does not necessarily have to be divided into a plurality of tether portions. Note that the illustrated shape of the single bag and the illustrated basic structure of the airbag apparatus 6 (including components such as the inflator 61 and the retainer 62) are provided by way of example only, and therefore, the present invention is applicable to various single bags.

The airbag apparatus 6 according to the third embodiment illustrated in FIG. 8B is provided by applying the present invention to a driver-side airbag apparatus. This airbag apparatus 6 is usually located in a steering wheel 66 by which the occupant P controls a steering angle. The steering wheel 66 has: an annular rim portion 66a; a boss portion 66b constituting a joint between the steering wheel 66 and a steering shaft (not illustrated); and a plurality of spoke portions (not illustrated) through which the rim portion 66a and the boss portion 66b are connected to each other. Specifically, the airbag apparatus 6 is located inside the boss portion 66b. For example, a front panel 14 to be located adjacent to the occupant P and a rear panel 15 to be located adjacent to the steering wheel 66 are sewn to each other, and thus the airbag 1 used in the driver-side airbag apparatus is formed into a bag body. For example, the tethers 3 are connected to the front panel 14 and the rear panel 15 to restrict the shape of the airbag 1 in an inflation and deployment direction. In this diagram, sewing threads at connections between the tethers 3 and the airbag 1 are omitted. Further, the tethers 3 are not limited to the ones that restrict the shape of the airbag 1 in an inflation and deployment direction, but the tethers 3 may restrict the shape of the airbag 1 in a vertical direction and/or in a lateral width direction. Note that the illustrated structure of the driver-side airbag apparatus (including the airbag 1) is provided by way of example only, and therefore, the present invention is applicable to various driver-side airbag apparatuses.

The airbag apparatus 6 according to the fourth embodiment illustrated in FIG. 8C is provided by applying the present invention to a side airbag apparatus. This airbag apparatus 6 is usually located at a door-side lateral position with respect to the seat S on which the occupant P sits. For example, the front panel 14 to be located adjacent to the occupant P and the rear panel 15 to be located adjacent to the door are sewn to each other, and thus the airbag 1 used in the side airbag apparatus is formed into a bag body. For example, the tethers 3 are connected to the front panel 14 and the rear panel 15 to restrict the shape of the airbag 1 in a lateral width direction. In this diagram, sewing threads at connections between the tethers 3 and the airbag 1 are omitted. Further, the tethers 3 are not limited to the ones that restrict the shape of the airbag 1 in a lateral width direction, but the tethers 3 may restrict the shape of the airbag 1 in a vertical direction and/or in an inflation and deployment direction. Note that the illustrated structure of the side airbag apparatus (including the airbag 1) is provided by way of example only, and therefore, the present invention is applicable to various side airbag apparatuses.

As described above, the airbag 1, the airbag apparatus 6 and the sewing method for the tether 3 according to the present invention are applicable to a case where the tether 3 for restricting the shape of the airbag 1 at the time of inflation and deployment is provided and the tether 3 is connected to a base fabric constituting an outer shell of the airbag 1 (e.g., the outer panel 2, the lateral panel 13, the front panel 14 or the rear panel 15).

The present invention is not limited to the foregoing embodiments but may also be applied to airbags except a passenger-side airbag, a driver-side airbag and a side airbag (for example, the present invention may also be applied to airbags such as a curtain airbag, a knee airbag and a pedestrian protection airbag). Therefore, various modifications may naturally be made without departing from the scope of the present invention.

While certain embodiments have been described, these embodiments have been presented by way of example only, and are not intended to limit the scope of the invention. Indeed, the novel methods and systems described herein may be embodied in a variety of other forms. Furthermore, various omissions, substitutions and changes in the form of the methods and systems described herein may be made without departing from the sprit of the invention. The accompanying claims and their equivalents are intended to cover such forms or modifications as would fall within the scope and sprit of the invention.

What is claimed is:

1. An airbag apparatus comprising:
an airbag that is folded up in a normal state and is inflated and deployed in an emergency state; and
an inflator configured to supply a deployment gas to the airbag,
wherein the airbag comprises:
a base fabric constituting an outer shell of the airbag;
a tether sewn to the base fabric and configured to restrict a shape of the airbag when the airbag is inflated and deployed by the deployment gas,
wherein
the base fabric has a first pin hole therethrough in a contact region where the base fabric and the tether contacts each other, and the tether has a second pin hole therethrough in the contact region, wherein a position of the second pin hole corresponds to a position of the first pin hole,
wherein the tether has a folded back portion sewn to the tether and covering the first and second pin holes, and
wherein the respective first and second pin holes are configured to receive a positioning pin for fixing the base fabric and tether to each other.

2. The airbag apparatus according to claim 1,
wherein a sewing line of the folded back portion is formed into a loop so as to surround the first and second pin holes.

3. The airbag apparatus according to claim 1, wherein the tether has a mark for determining a position of the folded back portion.

4. The airbag apparatus according to claim 3,
wherein the mark is a cut-out portion or protrusion formed along a folding line of the folded back portion, or at least one pair of cut-out portions or protrusions formed at positions that correspond to each other when the folded back portion is folded back.

5. The airbag apparatus according to claim 1, wherein the respective first and second pin holes include a plurality of first and second in holes formed at positions serving as asymmetric triangle vertexes.

6. The airbag apparatus according to claim 1, wherein the airbag comprises a plurality of the tethers, and arrangement of the first pin hole through the base fabric is different for each of the tethers.

7. The airbag apparatus according to claim 1,
wherein the tether comprises a plurality of tether portions which are separable from each other,
wherein each of the tether portions has:
a pair of protrusions at one end portion thereof; and
a pair of third pin holes provided in the pair of protrusions, and
wherein when the pair of protrusions of the adjacent tether portions overlap with each other, positions of the pair of third pin holes of the adjacent tether portions correspond to each other.

8. The airbag apparatus according to claim 1,
wherein the airbag further comprises:
a left inflation chamber inflated and deployed toward a left side of an occupant;
a right inflation chamber inflated and deployed toward a right side of the occupant;
a connection portion that connects the left inflation chamber and the right inflation chamber; and
a communication path which is formed in the connection portion, wherein the left inflation chamber and the right inflation chamber are communicated with each other through the communication path,
wherein the tether comprises:
a left tether, wherein one end of the left tether is sewn to a left outer panel of the left inflation chamber; and
a right tether, wherein one end of the right tether is sewn to a right outer panel of the right inflation chamber,
wherein the other end of the left tether and the other end of the right tether are connected to each other through the communication path or connected to the connection portion.

9. The airbag apparatus according to claim 8,
wherein each of the left and right tethers is foamed in a L-shape, and a bent portion of each of the left and right tethers is connected to the connection portion.

10. A method for sewing a tether to a base fabric of an airbag that is folded up in a normal state and is inflated and deployed in an emergency state, wherein the base fabric constitutes an outer shell of the airbag, and the tether is configured to restrict a shape of the airbag when the airbag is inflated and deployed, the method comprising:
- (a) inserting a positioning pin through a first pin hole of the base fabric in a contact region where the base fabric and the tether contacts each other;
- (b) inserting the positioning pin through a second pin hole of the tether in the contact region such that a position of the second pin hole corresponds to a position of the first pin hole;
- (c) sewing the tether to the base fabric;
- (d) removing the base fabric and tether from the positioning pin;
- (e) folding back the tether so as to cover the first and second pin holes; and
- (f) sewing a folded portion of the tether to the base fabric.

11. The method according to claim 10,
wherein in step (f), a sewing line of the folded back portion is formed into a loop so as to surround the first and second pin holes.

\* \* \* \* \*